United States Patent [19]
Itojima et al.

[11] Patent Number: 5,905,565
[45] Date of Patent: *May 18, 1999

[54] PHOTOGRAPHIC EXPOSURE APPARATUS WITH IMPROVED EXPOSURE CONTROL

[75] Inventors: Mitsuhiko Itojima; Keiji Morimoto, both of Wakayama, Japan

[73] Assignee: Noritsu Koki Co., Ltd., Wakayama, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/583,608

[22] Filed: Jan. 5, 1996

[30] Foreign Application Priority Data

Jan. 17, 1995 [JP] Japan .................................. 7-005045
Jan. 19, 1995 [JP] Japan .................................. 7-006699
Jan. 19, 1995 [JP] Japan .................................. 7-006700

[51] Int. Cl.$^6$ .......................... G03B 27/52; G03B 27/70; G03B 27/72
[52] U.S. Cl. .................................. 355/30; 355/66; 355/71
[58] Field of Search ................................. 355/30, 55, 57, 355/66, 215, 71

[56] References Cited

U.S. PATENT DOCUMENTS

| | | | |
|---|---|---|---|
| 3,936,176 | 2/1976 | Whited | 355/30 X |
| 4,018,526 | 4/1977 | Schroter | 355/68 |
| 4,025,181 | 5/1977 | Menon et al. | 355/215 |
| 4,060,324 | 11/1977 | Wakatsuki | 355/60 |
| 4,074,217 | 2/1978 | Yanagawa | 355/30 |
| 4,462,682 | 7/1984 | Monma | 355/215 |
| 4,693,588 | 9/1987 | Yarbrough et al. | 355/215 X |
| 4,786,949 | 11/1988 | Yamamoto | 355/66 X |
| 5,036,352 | 7/1991 | Kamimura et al. | 355/45 |

*Primary Examiner*—Fred L. Braun
*Attorney, Agent, or Firm*—Wenderoth, Lind & Ponack, LLP

[57] ABSTRACT

A photographic exposure apparatus includes an exposure lens, a lens carriage having a light shield region and a lens mount region, and a device to move the lens carriage selectively to a position with the lens extending across an axis of exposure light. A first shutter controls the exposure light. A second shutter prevents the exposure to scattered light. A mechanical linking device is responsive to the movement of the lens carriage to close and open the second shutter. When the lens on the lens carriage is dislocated from the axis of exposure light in a standby mode, the mechanical linking device closes the second shutter to interrupt scattered light. When the lens extends across the axis of exposure light in an exposure mode, the mechanical linking device opens the second shutter.

19 Claims, 16 Drawing Sheets

PHOTOGRAPHIC EXPOSURE APPARATUS WITH IMPROVED EXPOSURE CONTROL

BACKGROUND OF THE INVENTION

The present invention relates to a photographic exposure apparatus equipped with an optical system including different types of exposure lenses.

Such a photographic exposure apparatus allows an intensity of light emitted from alight source to be passed through a negative film set in a negative mask after being reflected on a reflector mirror, and focused by various focal or zoom lens onto a sheet of photosensitive paper located at an exposure position for reproducing a frame image of the negative film.

The photographic exposure apparatus includes a first shutter for controlling the duration of exposure and a second shutter for shielding unwanted light. Opening and closing of the two shutters are controlled by a controller means. In addition, a scanner is provided for reading relevant data of frame images on the negative film loaded in the negative mask.

The first and second shutters in the conventional photographic exposure apparatus are driven by respective drive means which are actuated by the controller means, for example as shown in Japanese Utility-model Application 1-149648(1989). As the drive means for the shutters are not simple and the controller means requires control software, the overall cost of the apparatus will increase.

It is also known that the optical system including the scanner and various focal or zoom lens should be cleaned by removing dust from the surfaces of the lenses manually with the use of a brush, clean rag, or fan blower. The optical system of the apparatus is mounted substantially in a casing, and therefore cleaning of the optical system will e difficult and troublesome. The cleaning or removal of dust has to be carried out manually and periodically. Dust and dirt on the optical system cannot be removed completely by use of a fan blower or the like.

It is an object of the present invention, in view of the foregoing predicaments, to provide an improved photographic exposure apparatus in which the shutter driving mechanism and controlling software are simplified and the removal of dust from the optical system including an exposure lens and a negative sensor is automatically conducted upon each printing operation.

SUMMARY OF THE INVENTION

On aspect of the present invention includes a photographic exposure apparatus having an exposure lens, a lens carriage having a light shield region and a lens mount region, a switching means for moving the lens carriage to locate selectively the light shield region or the lens mount region across an axis of exposure light, and a shutter for controlling the exposure light.

The lens carriage may have a reflector mirror mounted at the light shield region and also may have a scanner for reading through the reflector mirror data of a desired frame image on a negative film.

Another aspect of the invention includes a photographic exposure apparatus having an exposure lens, a lens carriage having a light shield region and a lens mount region, a switching means for moving the lens carriage to locate selectively the lens across an axis of exposure light, a first shutter for controlling the exposure light, a second shutter for preventing exposure to scattered light, and a mechanical linking means responsive to movement of the lens carriage for closing and opening the second shutter. In operation, when the lens on the lens carriage is dislocated from the axis of exposure light in a standby mode, the mechanical linking means closes the second shutter to interrupt the scattered light, and when the lens is moved to a position to extend across the axis of exposure light in an exposure mode, the mechanical linking means opens the second shutter. The mechanical linking means may include a projection which is disposed on the second shutter and actuated by the lens carriage to open and close the second shutter.

The invention provides a photographic exposure apparatus for projecting an image on a negative film through an exposure lens onto a sheet of printing paper, the exposure lens being movable forwardly and backwardly by a forward and backward traveling means. A dust removing means is mounted to a casing for removing dust from the exposure lens during the forward and backward movement of the exposure lens.

The invention further provides a photographic exposure apparatus for reading data of a desired image from a negative film with a scanner and projecting the image through an exposure lens onto a sheet of printing paper located at an exposure position. The exposure lens is arranged to be movable forwardly and backwardly by a forward and backward traveling means. The scanner is mounted to a casing adjacent to the forward and backward traveling means. Dust removing means are mounted to the forward and backward traveling means and/or the casing for removing dust from the exposure lens and/or the scanner during the forward and backward movement of the traveling means.

A fan may be mounted at an appropriate location of the casing for assisting or helping the dust removing means in removing dust.

The lens carriage allows its light shield region to interrupt the scattered light when it is dislocated from the axis of exposure light during the standby mode. When the lens carriage is positioned with its exposure lens extending across the axis of exposure light in the exposure mode, the light shield region is spaced from the axis of exposure light and thus passes the exposure light to the printing paper. Accordingly, an extra shutter for interrupting the scattered light is not needed. The standby mode provides the reflector mirror on the lens carriage to extend across the axis of exposure light to allow the scanner to read the data of the desired image on the negative film while the light shield region of the lens carriage maintains interruption of the scattered light. The lens carriage locates the lens across the axis of exposure light during the exposure mode. The movement of the lens carriage controls opening and closing the light path by locating the exposure lens out of the axis of exposure light in the standby mode and across the same in the exposure mode, thus eliminating the need of an extra drive mechanism for a second shutter or an intricate software for controlling movement.

In another aspect of the invention, the second shutter is actuated directly by the movement of the lens carriage to interrupt the scattered light in the standby mode. The second shutter is opened synchronous with the movement of the lens carriage to the exposure mode thus exposing the printing paper to the exposure light. As the lens carriage is moved to the standby mode, it presses against the projection on the second shutter thus closing the second shutter. The return movement of the lens carriage to the exposure allows the opening of the second shutter. The opening and closing movements of the second shutter are triggered by the lens carriage traveling to locate the exposure lens out of the axis of exposure light in the standby mode and across the same in the exposure mode, thus eliminating the need of an extra drive mechanism for the second shutter or intricate software for controlling the movement.

While the exposure lens is moved to the exposure position for exposure therethrough, the lens is swept by the dust removing means so that its dust or dirt is removed. During the forward and backward movement to and from the exposure position for exposure through the exposure lens and allowing the scanner to read data of a desired image, respectively, the exposure lens and the scanner are swept by dust removing means mounted on the casing and on the forward and backward traveling means so that dust or dirt effectively is removed. If the forward and backward traveling means is moved to allow the exposure lens to project an image on the negative film and the scanner to read data thereof, cleaning by the dust removing means can be conducted at every exposure operation.

The fan disposed in the predetermined location produces a flow of air towards the exposure lens and the scanner, thus assisting or helping the dust removal operation of the dust removing means and removing dust or dirt more effectively.

DETAILED DESCRIPTION OF THE PREFERRED EMBODIMENTS

Embodiment 1

Figure 1:
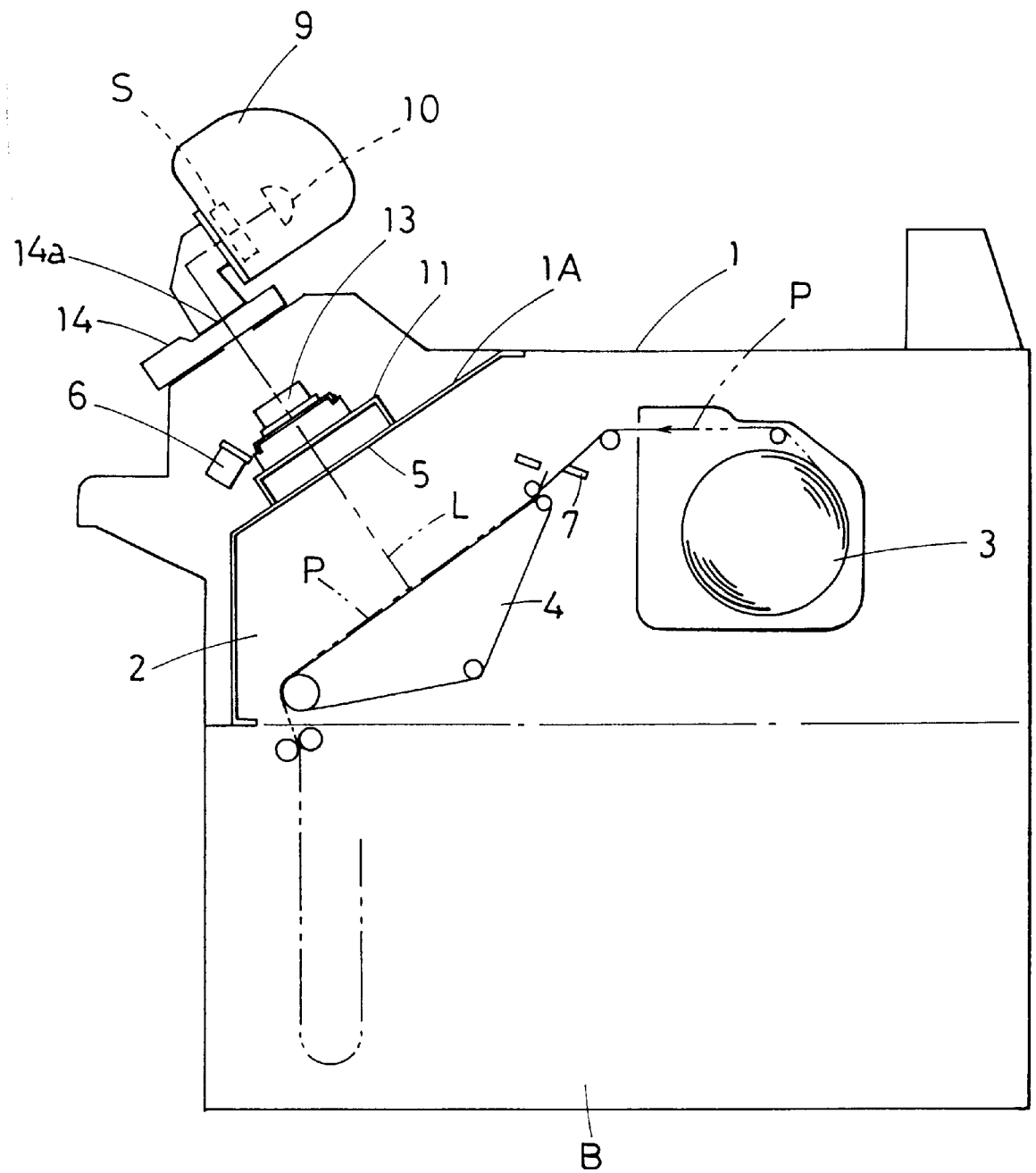
FIG. 1 is a schematic view of a photographic exposure apparatus according to Embodiment 1 of the present invention.

FIG. 1 is a schematic view of a photographic exposure apparatus equipped with a shutter device, in which a casing 1 has a dark room 2 therein defined by a partition 1A. A paper magazine 3, an exposure bed 4, and a cutter 7 are provided in the dark room 2. A sheet of printing paper P unloaded from a roll in the paper magazine 3 is cut by the cutter 7 into strips of predetermined size. The strips are transferred to the exposure bed 4 where frame images of a negative film 14a set in a negative mask 14 are printed on the strips before being developed in a development station B. The partition 1A of the casing 1 has therein an exposure opening 5 having a center located across an exposure axis L. A lamp box 9 is provided above the casing 1 and contains a light source 10 and an exposure controlling shutter S. The shutter S is actuated to be opened and closed by a drive means (not shown) which is controlled by a controller means (not shown). Also, a lens carriage 11 has a group of exposure lenses 13 mounted thereon and is located to cover the opening 5 of the partition 1A.

Figure 4:
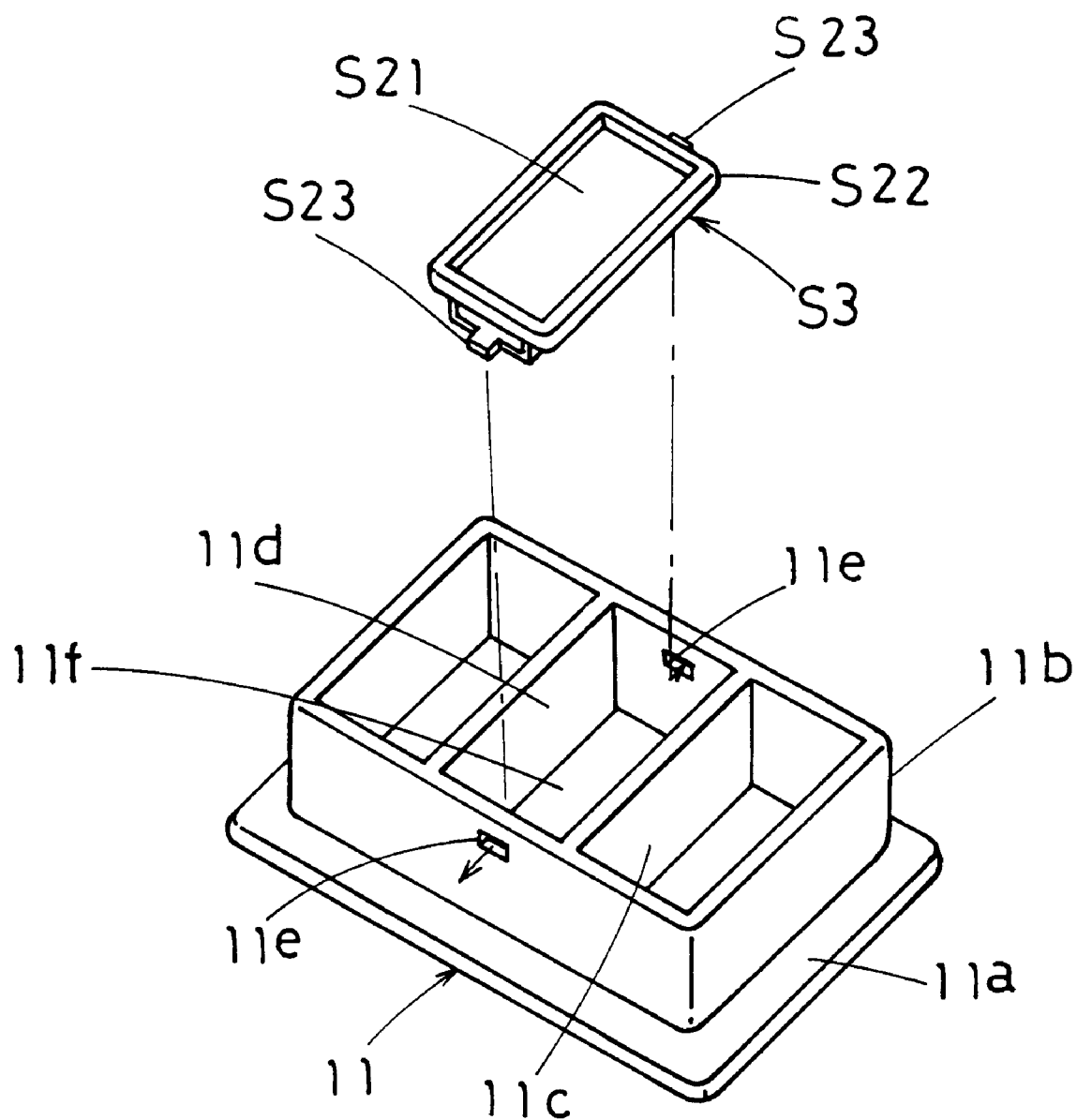
FIG. 4 is a perspective view of Embodiment 1.

The lens carriage 11 is formed as a box shape and includes a light shielding wall 11b extending downwardly from the edge of a base plate 11a, and three spaces defined by two inner walls 11c and 11d (FIG. 4). The base plate 11a has therein two apertures (not shown) at which are installed a zoom lens 13a and various focal lens 13b, respectively. The center of the base plate 11a serves as a shutter curtain 11f and has a reflector mirror 13c mounted thereon (FIGS. 5(A) and 5(B)). As the lens carriage 11 is moved forward and backward by a switching means 15 (described later), any of the zoom lens 13a, the various focal lens 13b, and the reflector mirror 13c can be positioned across the exposure axis L. With the lens 13a or 13b so positioned, a selected image of the negative film is projected at a desired exposure setting onto the printing paper P. When the reflector mirror 13c is so positioned, a scanner 6 disposed beside the lens carriage 11 can read data of a selected image and simultaneously the printing paper P is protected from being exposed to scattered light. The various focal lens 13b comprise a set of different focusing lenses which are detachably mounted to the lens carriage 11 and correspond to multiple sizes of the negative film.

A light shielding member S3 is provided for blocking scattered light to not expose the printing paper P when closing the opening 5. The light shielding member S3 has a rim projection S22 extending from the outer edge of a main body S21. The main body S21 has at opposite ends thereof two engaging tabs S23 and is shaped to a size sufficient for closing thoroughly the opening 5 of the partition 1A. The light shielding wall 11b of the lens carriage 11 has two engaging slots lie provided in lower regions of the opposite sides thereof for detachably accepting respective of the engaging tabs S23 of the light shielding member. S3 (as shown by the arrows in FIG. 4). The light shielding member S3 is slightly projected from the bottom of the lens carriage 11 when mounted on the same so that it can close a gap Q between the lens carriage 11 and the partition 1A to prevent the escape of scattered light (FIG. 5).

Figure 2:
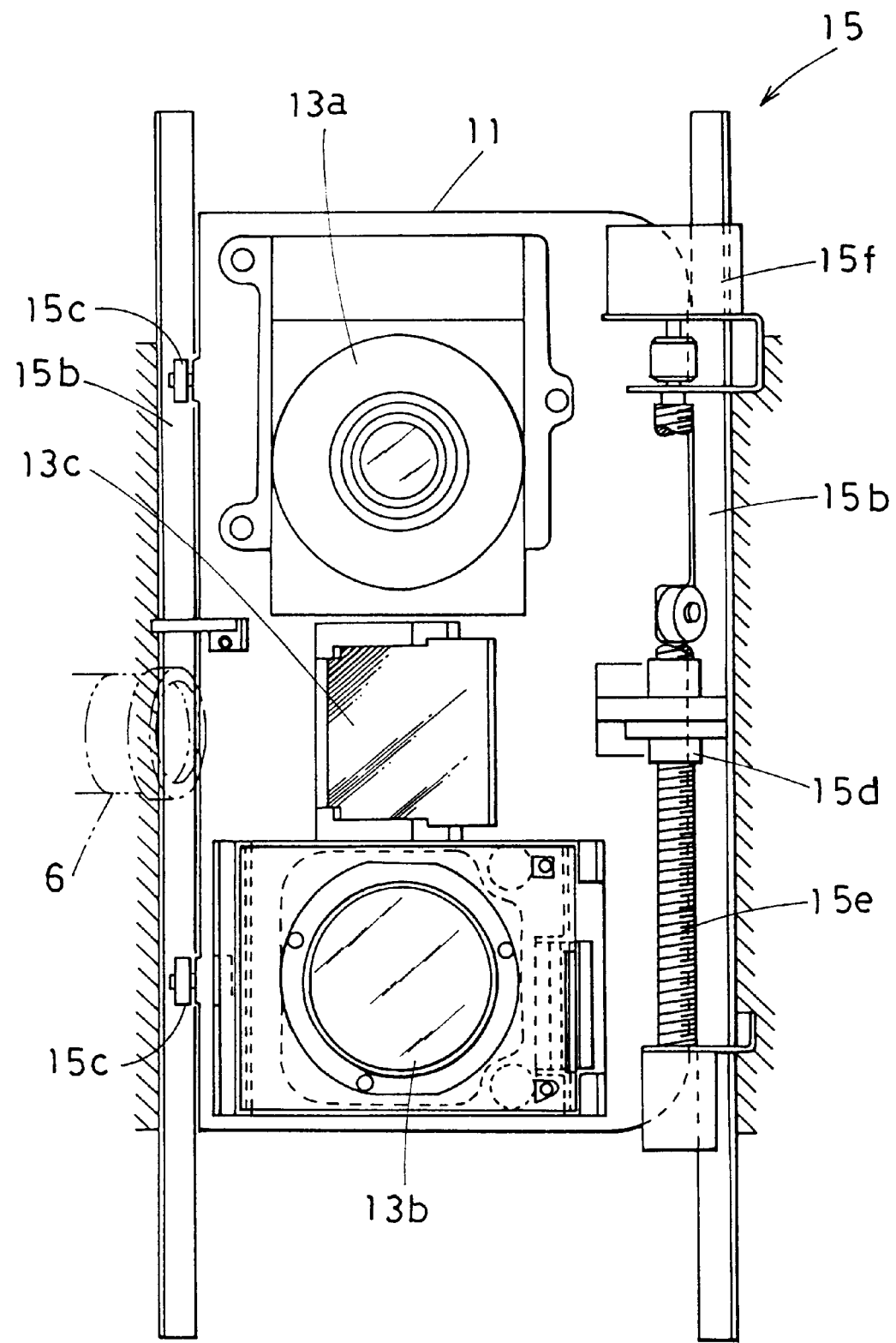
FIG. 2 is a plan view of Embodiment 1.
Figure 3:
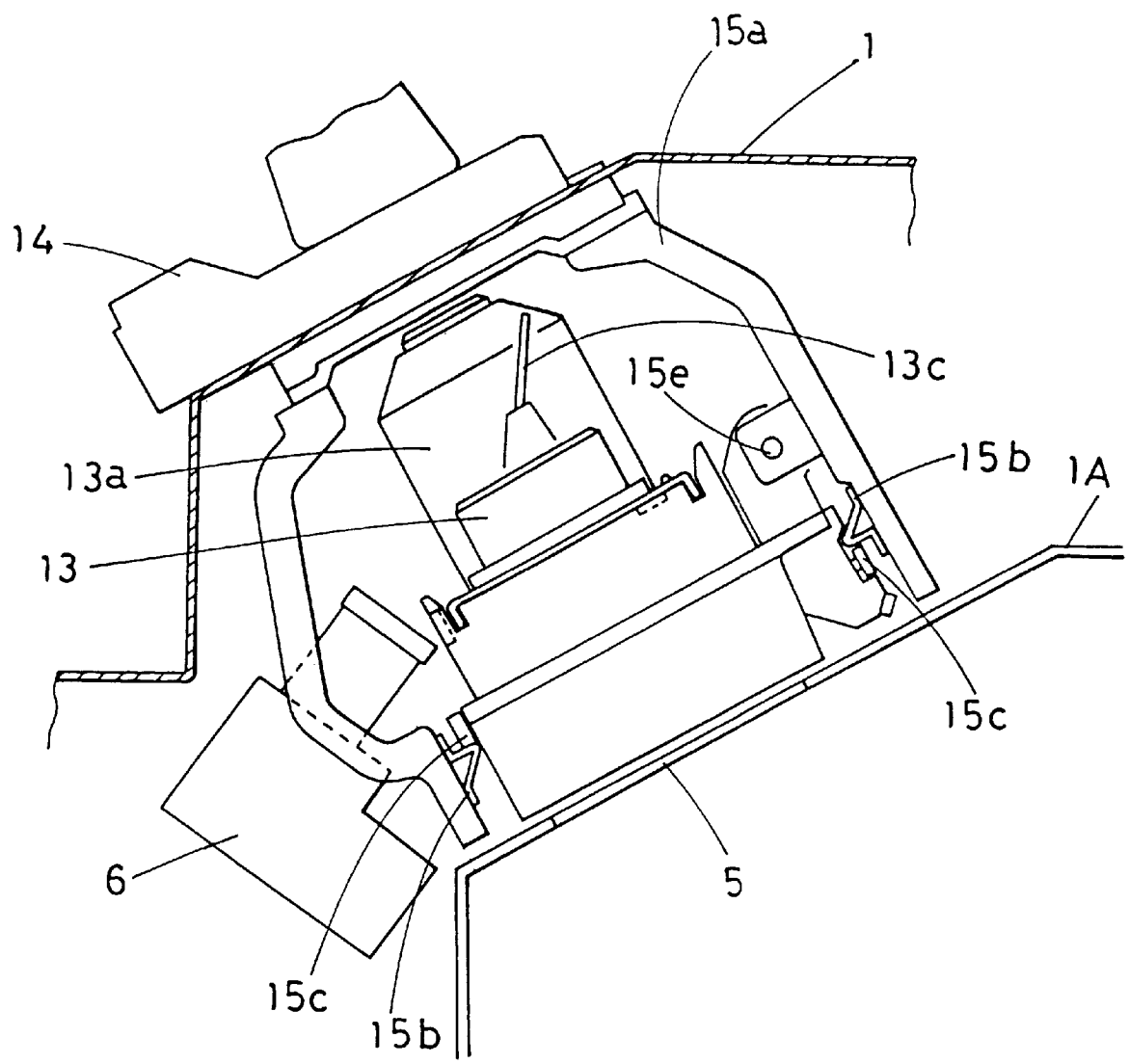
FIG. 3 is a front view of Embodiment 1.

FIG. 2 is a plan view of the switching means 15. M switching means 15 has two, left and right, rails 15b located at opposite sides of the opening 5 and joined to lowermost ends of a frame 15a fixedly mounted on the casing 1 as shown in FIG. 3. The lens carriage 11 is also provided at opposite sides thereof with rollers 15c which run on the rails 15b for carrying the lens carriage 11 forwardly and backwardly along the rails 15b. A nut 15d is mounted on one side of the lens carriage 11. A leadscrew 15e is arranged parallel to one of the rails 15b and is rotated by a motor 15f. The nut 15d on the lens carriage 11 is threaded onto the leadscrew 15e so that the lens carriage 11 moves forwardly and backwardly along the rails 15b when the leadscrew 15e is rotated in opposite directions. Operation of the motor 15f, determined by a controller means (not shown), moves lens carriage 11 to respective exposure positions where any of the zoom lens 13a, various focal lens 13b, and reflector mirror 13c lies across the exposure axis L.

The timing of movement of the lens carriage 11 for an exposure operation in the exposure apparatus now will be explained.

(1) One of the zoom lens 13a and the various focal lens 13b suitable for an exposure requirement first is positioned across the exposure axis L by location of the lens carriage 11. This allows the intensity of light to pass across the zoom lens 13a or various focal lens 13b through the opening 5 (FIG. 5 (B)). At such time, the shutter S remains closed.

(2) Upon the shutter S being opened, the intensity of light passed through the negative film 14a is allowed to focus on the printing paper P for printing a desired image.

(3) After completion of such exposure to the printing paper P, the shutter S is closed to interrupt incident light.

Figure 5A:
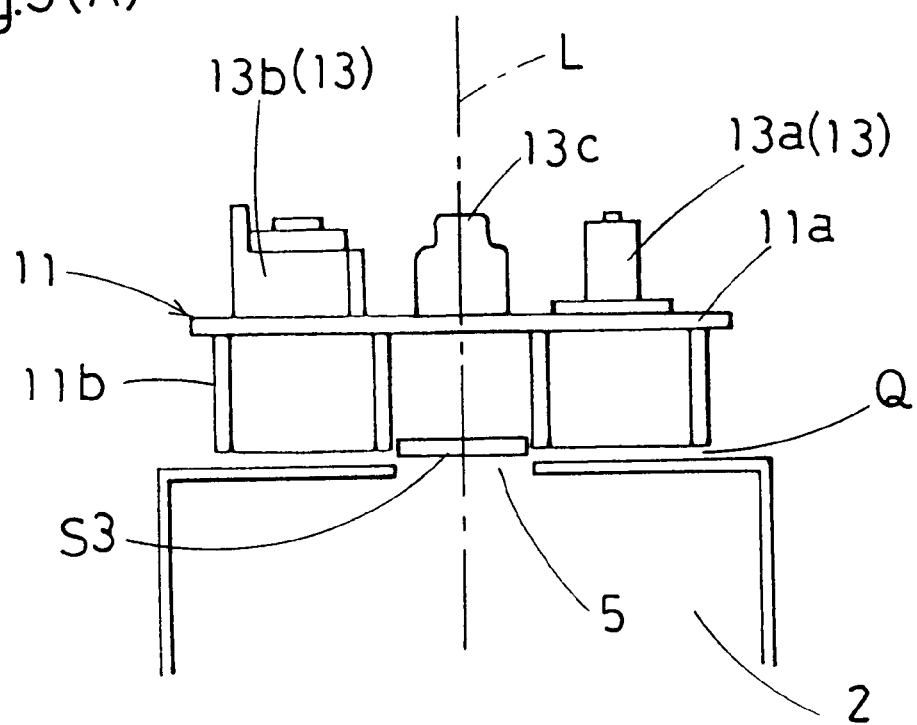
FIGS. 5(A) and 5(B) are schematic views showing operation of Embodiment 1.
Figure 5B:
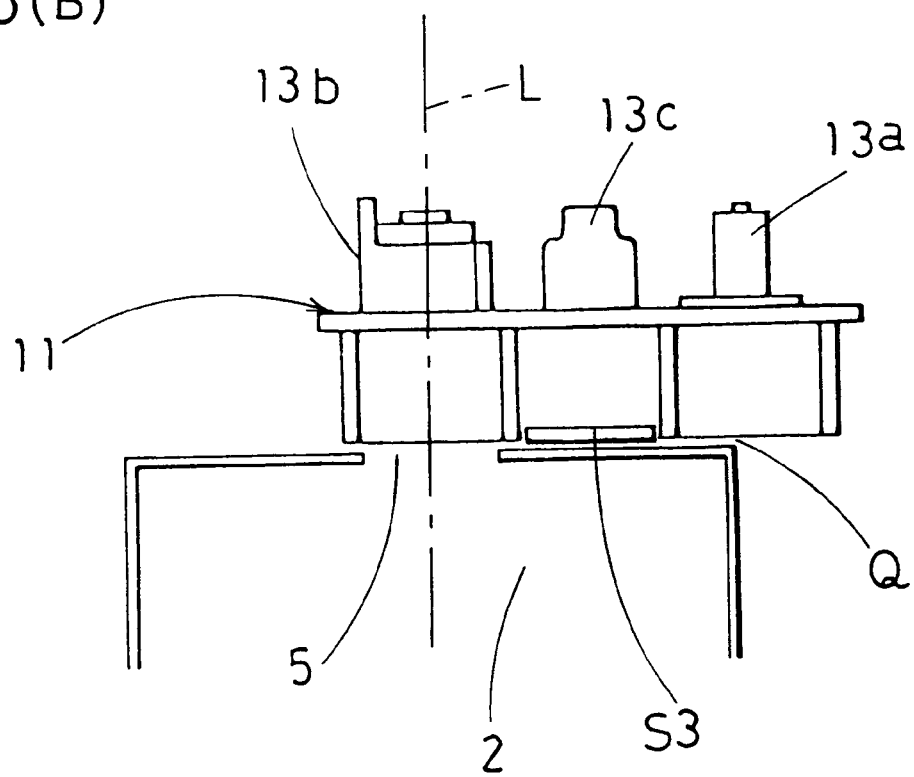

(4) The lens carriage 11 is then moved to switch from the lens 13a or 13b to the reflector mirror 13c being positioned across the exposure axis L (FIG. 5(A)). This allows the shutter curtain 11f to close the opening 5 and interrupt the incident light. During interruption of the exposure operation, the negative 14a may be scanned by the scanner 6 for reading relevant data.

It is to be understood that the light shielding member S3 on the lens carriage 11 may be omitted when the gap Q is minimized sufficiently to inhibit the entry of scattered light, i.e. by specific construction of the walls 11b to lid of the lens carriage 11.

Embodiment 2

Figure 6:
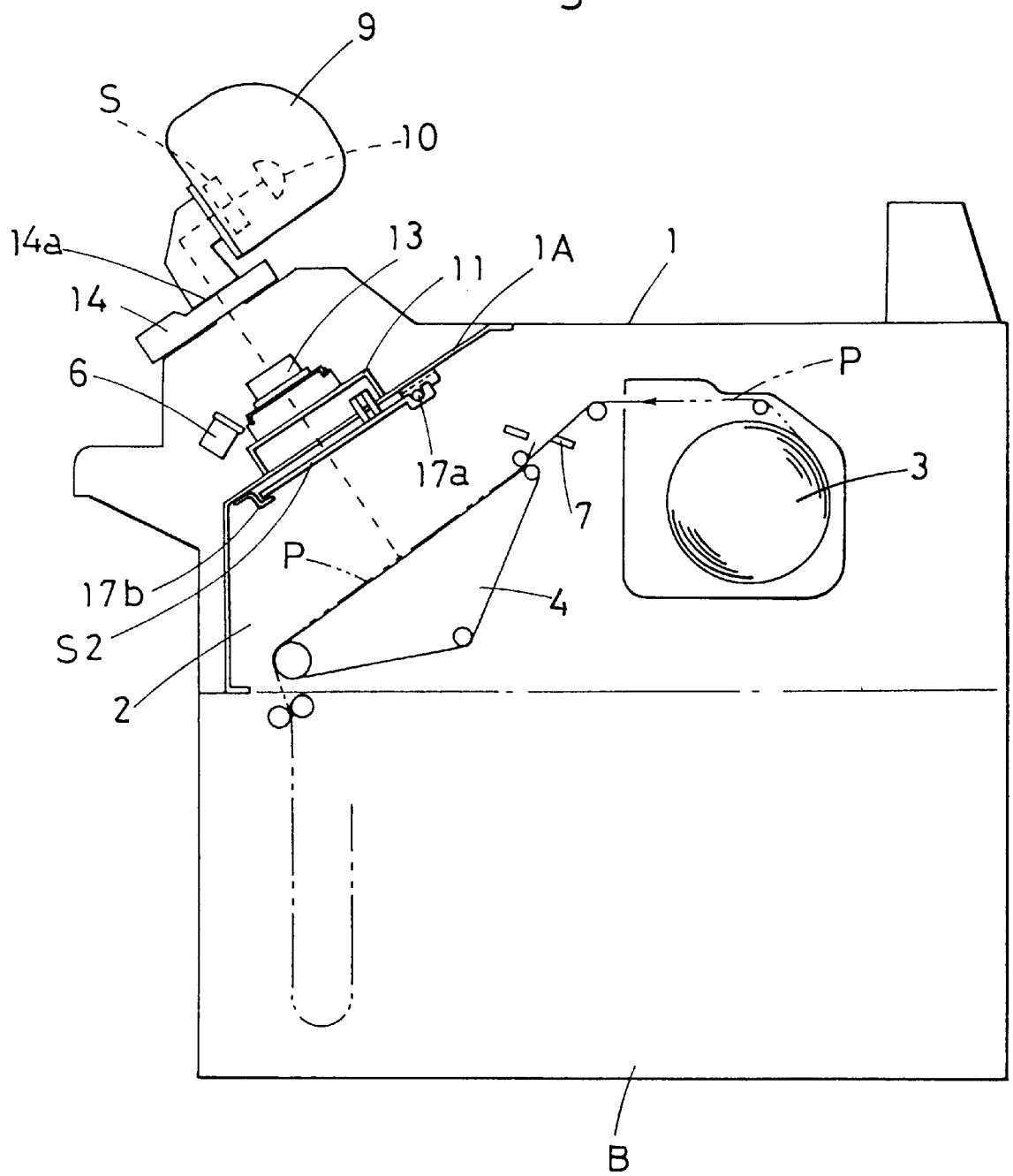
FIG. 6 is a schematic view of a photographic exposure apparatus according to Embodiment 2 of the present invention.
Figure 7:
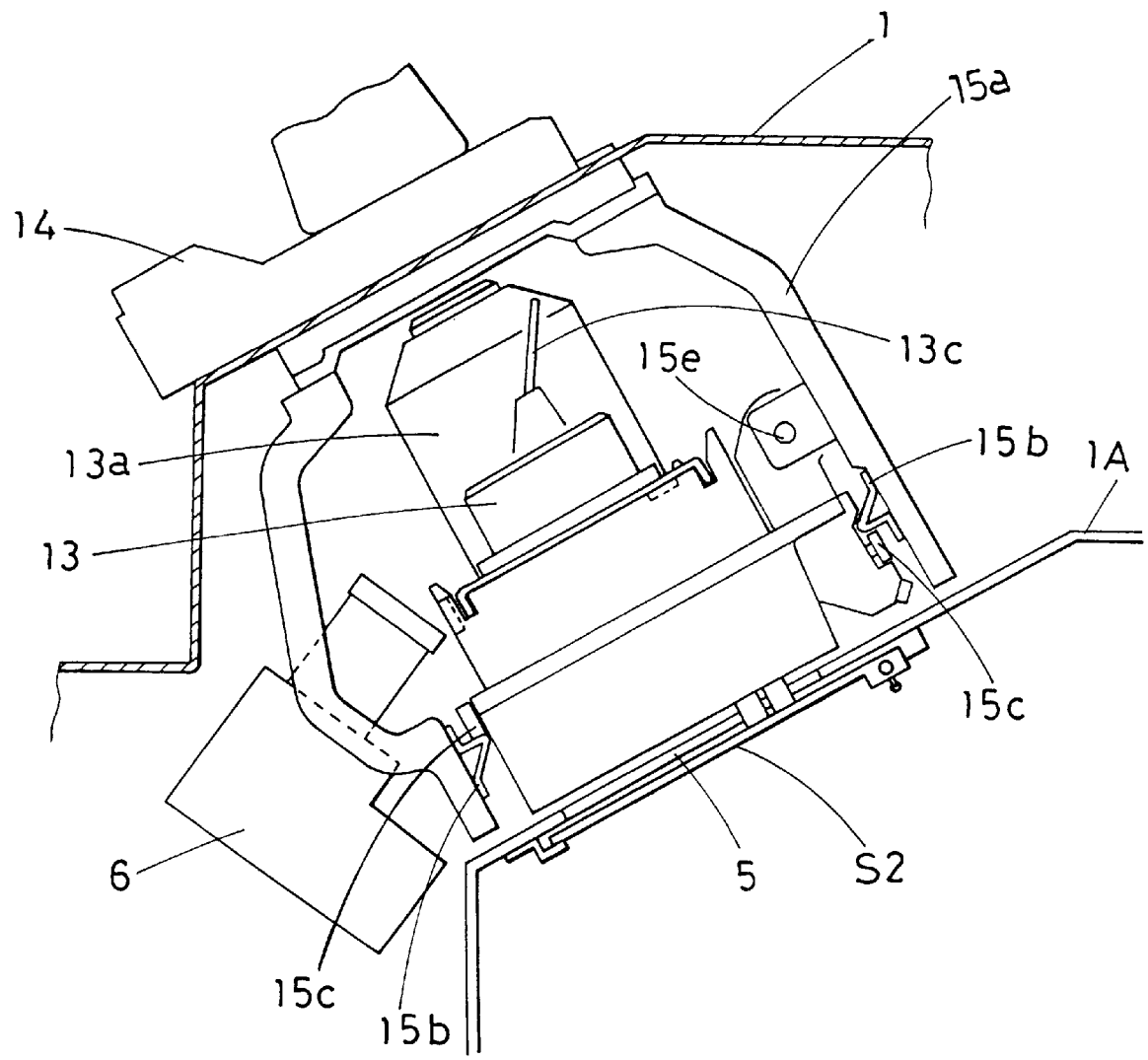
FIG. 7 is a front view of Embodiment 2.

FIG. 6 is a schematic view of another photographic exposure apparatus equipped with a shutter device, in which a casing 1 has a dark room 2 therein defined by a partition 1A. A paper magazine 3, an exposure bed 4, and a cutter 7 are provided in the dark room 2. A sheet of printing paper P unloaded from a roll in the paper magazine 3 is cut by the cutter 7 into strips of predetermined size. The strips are transferred to the exposure bed 4 where frame images of a negative film 14a set in a negative mask 14 are printed on the strips before being developed in a development station B. The partition 1A of the casing 1 has therein an exposure opening 5 having a center located across exposure axis L. A lamp box 9 is provided above the casing 1 and contains a light source 10 and a first shutter S. The first shutter S is actuated to be opened and closed by a drive means (not shown) which is controlled by a controller means (not shown). Also, a lens carriage 11 has a group of exposure lenses 13 mounted thereon and is located to cover the opening 5 of the partition 1A.

The lens carriage 11 is formed as a box shape and includes a light shielding wall 11b extending downwardly from the edge of a base plate 11a, and three spaces defined by two inner walls 11c and lid. The base plate 11a has therein two apertures (not shown) at which are installed a zoom lens 13a and a various focal lens 13b, respectively. The center of the base plate 11a has a reflector mirror 13c mounted thereon. As the lens carriage 11 is moved forward and backward by a switching means 15, any of the zoom lens 13a, the various focal lens 13b, and the reflector mirror 13c can be positioned across the exposure axis L. With the lens 13a or 13b so positioned, a selected image of the negative film is projected at a desired exposure setting onto the printing paper P. When the reflector mirror 13c is so positioned, a scanner 6 disposed beside the lens carriage 11 can read data of a selected image and simultaneously the printing paper P is protected from being exposed to scattered light. Switching means 15 is identical in construction to that of Embodiment 1 and will not be explained in further detail. The various focal lens 13b comprise a set of different focusing lenses which are detachably mounted to the lens carriage 11 and correspond to multiple sizes of the negative film.

A second shutter S2 is provided to prevent the printing paper P from being exposed to scattered light. The second shutter S2 is designed to close and open the opening 5 by operation of a mechanical linking means 16 which is synchronized with the movement of the lens carriage 11. The second shutter S2 comprises a pair of shutter plates S24 and S25 driven by a close/open mechanism 17 for closing and opening the opening 5.

Figure 8:
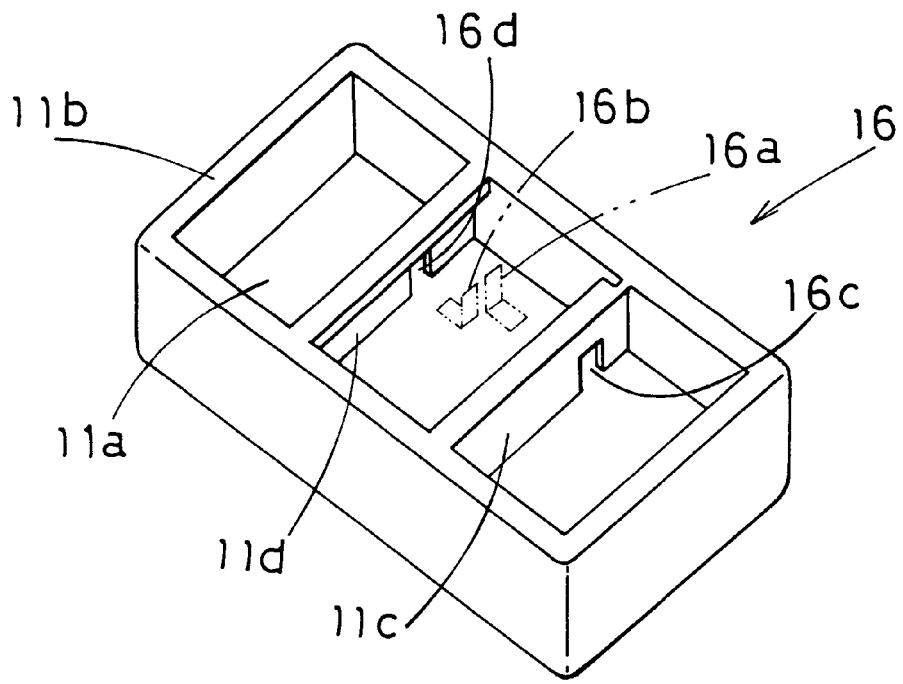
FIG. 8 is a perspective view of Embodiment 2.
Figure 8:
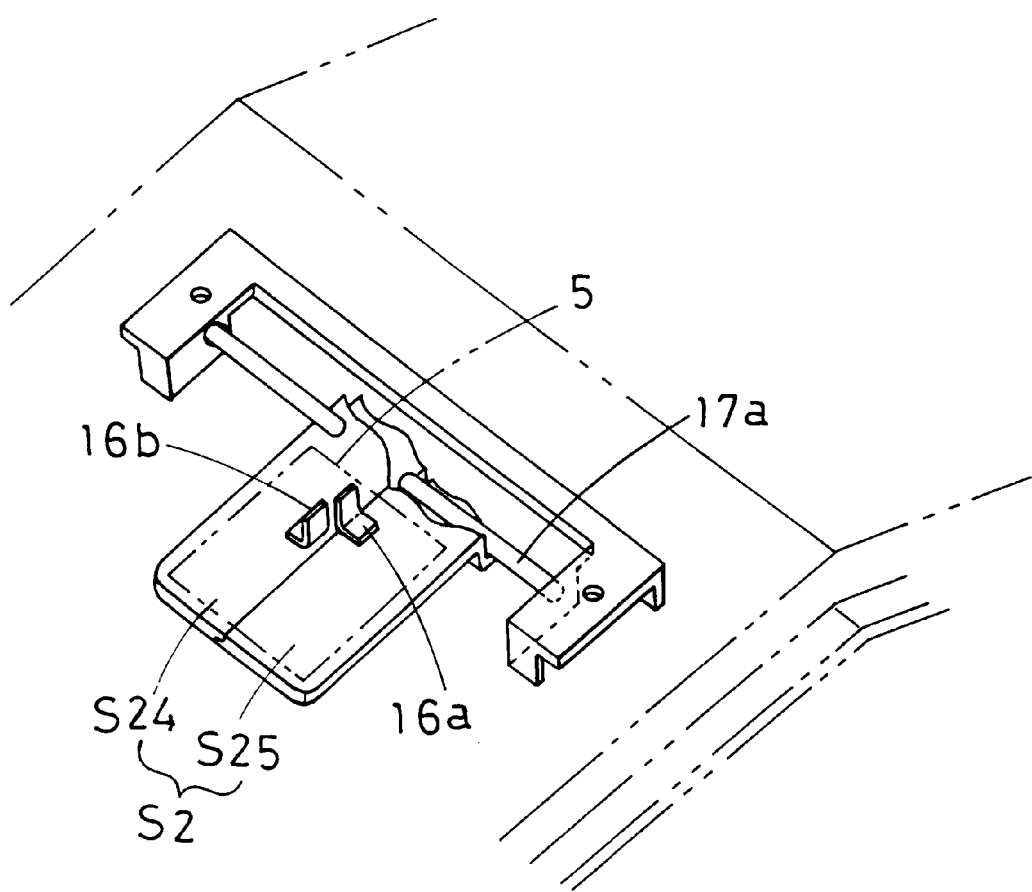
Figure 9:
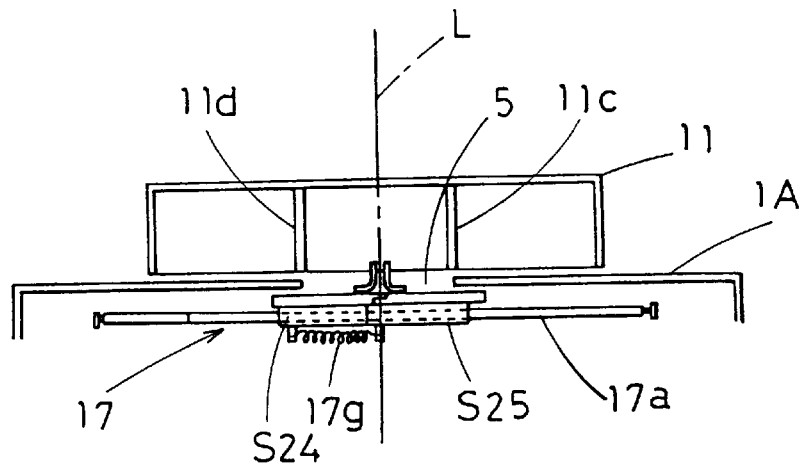
FIG. 9 is a side view of a mechanical linking means of Embodiment 2.
Figure 10:
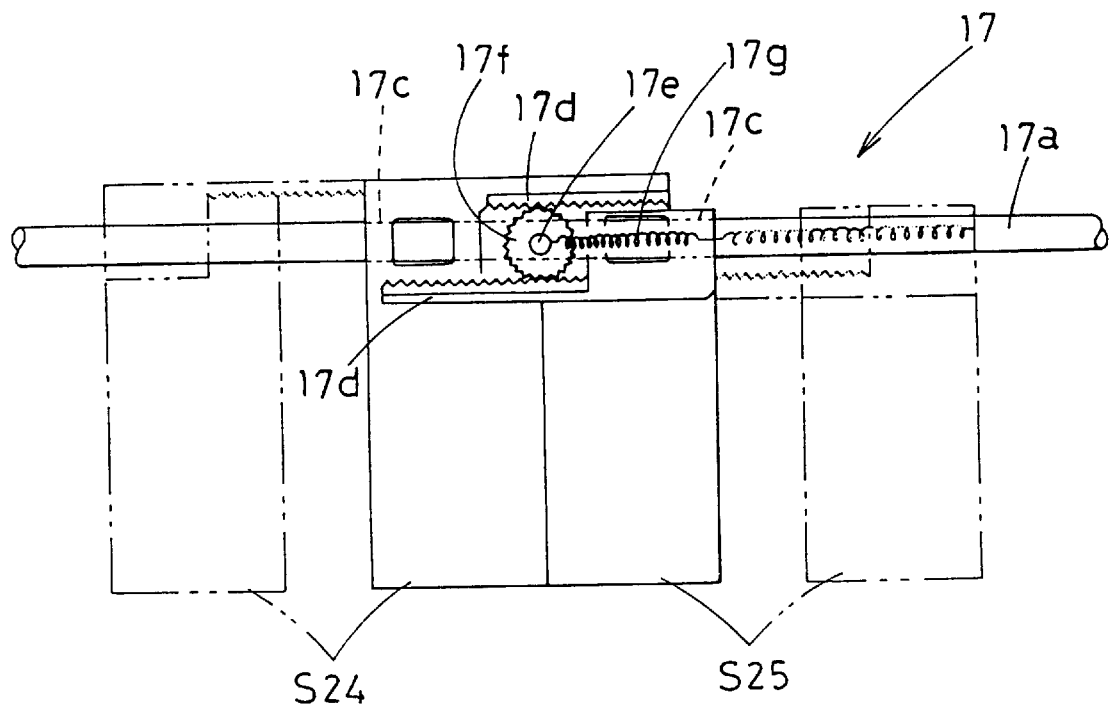
FIG. 10 is a bottom view of the mechanical linking means of Embodiment 2.

The close/open mechanism 17 is constructed as illustrated in FIGS. 8 to 10. A guide bar 17a and a guide rail 17b are provided on opposite sides of the opening S. The guide bar 17a is engaged with apertures 17c provided in first ends of shutter plates S24 and S25. Other ends of the shutter plates S24 and S25 are supported by the guide rail 15b. The first ends of the shutter plates S24 and S25 also are provided with racks 17d. The racks 17d are in mesh with a pinion 17f therebetween which is fixedly mounted on a pinion shaft 17e located in the center of the guide bar 17a. A resilient member (a compression spring) 17g is mounted between the shutter plate S25 and the pinion shaft 17e for urging the two shutter plates S24 and S25 towards each other.

The mechanical linking means 16 is arranged as shown in FIGS. 8 to 10. Two projections 16a and 16b are mounted on respective shutter plates S25 and S24 of the second shutter S2. The two projections 16a and 16b are dislocated or offset from each other is a direction at a right angle to the direction of opening and closing movement of the shutter plates S24 and S25. The inner walls 11c and lid of the lens carriage 11 have therein respective notches 16c and 16d. The notches 16c and 16d are sized and located so that they clear the projections 16a and 16b of the two shutter plates S25 and S24.

The timing of movement of the second shutter S2 for an exposure operation in the exposure apparatus now will be explained.

Figure 11A:
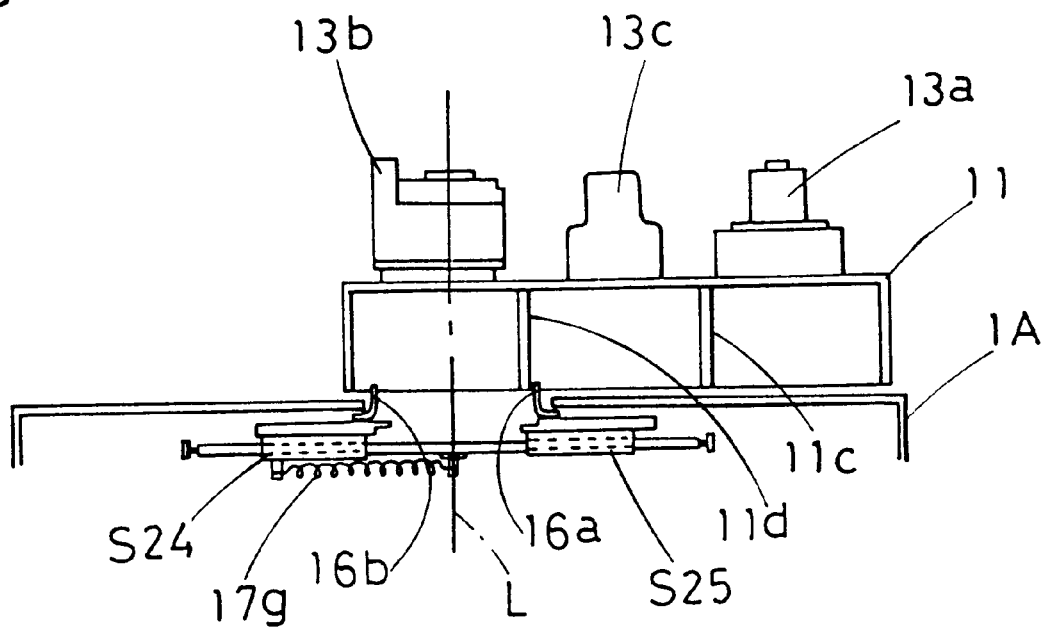
FIGS. 11(A) and 11(B) are schematic views showing operation of Embodiment 2.

(1) FIG. 9 shows the position of carriage 11 at which the reflector mirror 13c extends across the exposure axis L while the second shutter S2 is closed. The lens carriage 11 is then moved until the various focal lens 13b is positioned across the exposure axis L. During such movement of the lens carriage 11, the projection 16b passes through the notch 16d of the inner wall lid while the projection 16a is pressed by the inner wall 11d. This causes the two shutter plates S24 and S25 to open against the urging force of the resilient member 17g (FIG. 11(A)).

At such time, the first shutter S remains closed.

(2) Upon the first shutter S being opened, the intensity of light passed through the negative film 14a is allowed to focus on the printing paper P for printing a desired image.

(3) After completion of the exposure to the printing paper P, the first shutter S is closed to interrupt the incident light.

(4) The lens carriage 11 is then moved until the reflector mirror 13c is positioned across the exposure axis L. This allows the second shutter S2 to be closed by the urging force of the resilient member 17g, to thus interrupt the incident light (FIG. 9).

Figure 11B:
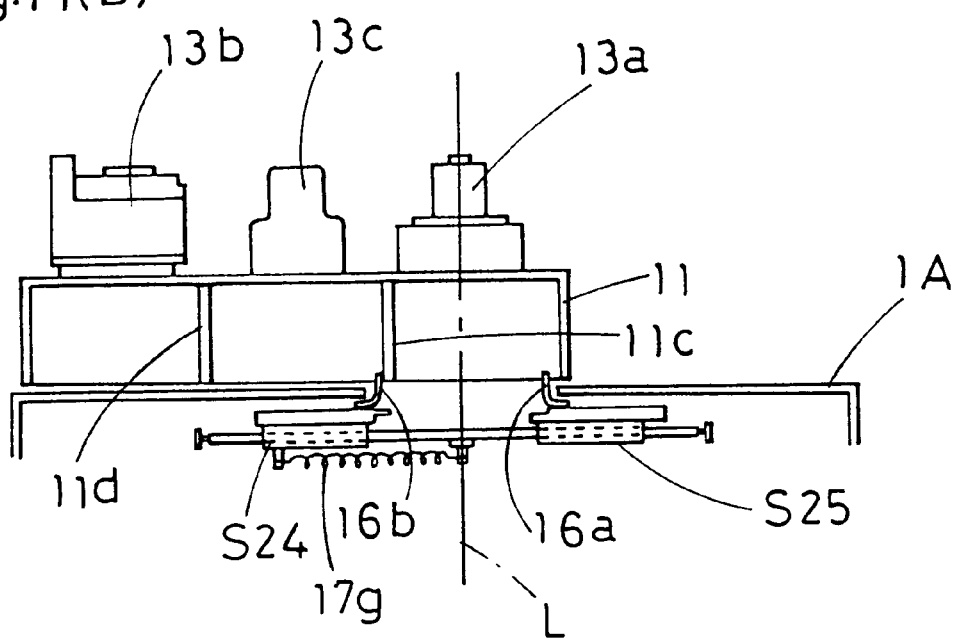

(5) The lens carriage 11 is moved again until the zoom lens 13a is positioned across the exposure axis L. The projection 16a passes through the notch 16c of the inner wall 11a of the lens carriage 11, the projection 16b is pressed by the inner wall 11c. This causes the shutter plates S24 and S25 to open against the urging force of the resilient member 17g (FIG. 11(B)), thus allowing data of a frame image to be printed on the printing paper P.

According to Embodiment 2, the operations of opening and closing the second shutter S2 are accomplished and determined by the movement of the lens carriage 11. It will be understood that the lens carriage 11 may be employed, whether or not it provides a light shielding effect.

Embodiment 3

Embodiment 3 of the present invention will be described with reference to FIGS. 12 to 17.

Figure 12:
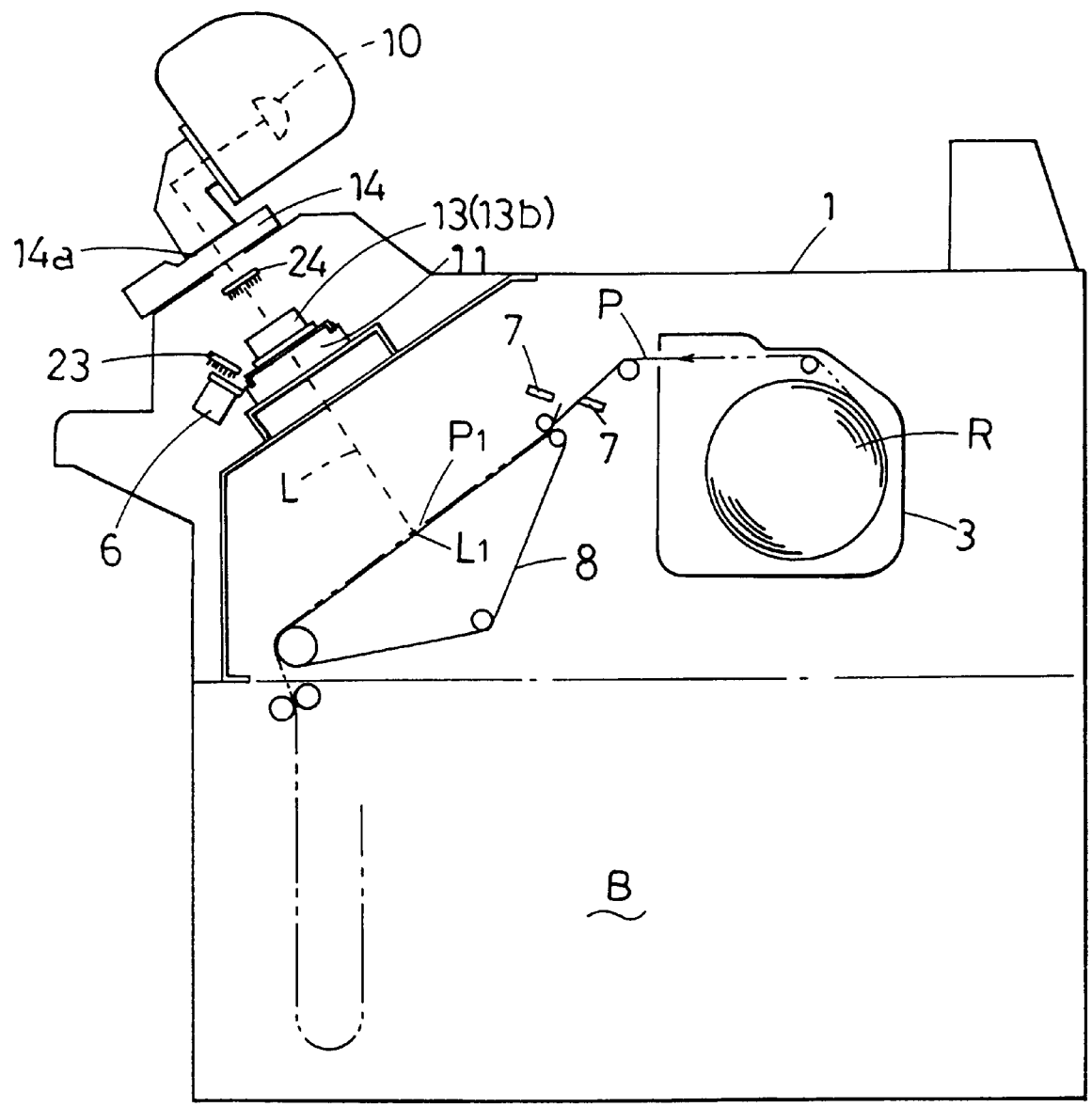
FIG. 12 is a schematic view of a photographic exposure apparatus according to Embodiment 3 of the present invention.

As best shown in FIG. 12, a sheet of printing paper P unloaded from a roll in a paper magazine 3 is cut by a cutter 7 into strips $P_1$ of a predetermined size, and such strips are transferred to an exposure location $L_1$ by a transfer device 8. Denoted by B is a development unit. A light source 10 is mounted above a casing 1 to emit an intensity of light which is reflected by a reflector mirror (not shown) and directed to a negative film 14a loaded in a negative mask 14. This allows a desired image on the negative film 14a to be focused and projected through an exposure lens system 13 (FIG. 13) including a zoom lens 13a and a various focal lens 13b onto the printing paper strips $P_1$ at the exposure location $L_1$. The zoom lens 13a and various focal lens 13b are arranged to be movable forwardly and backwardly across the exposure location $L_1$ by a driving means.

Figure 13:
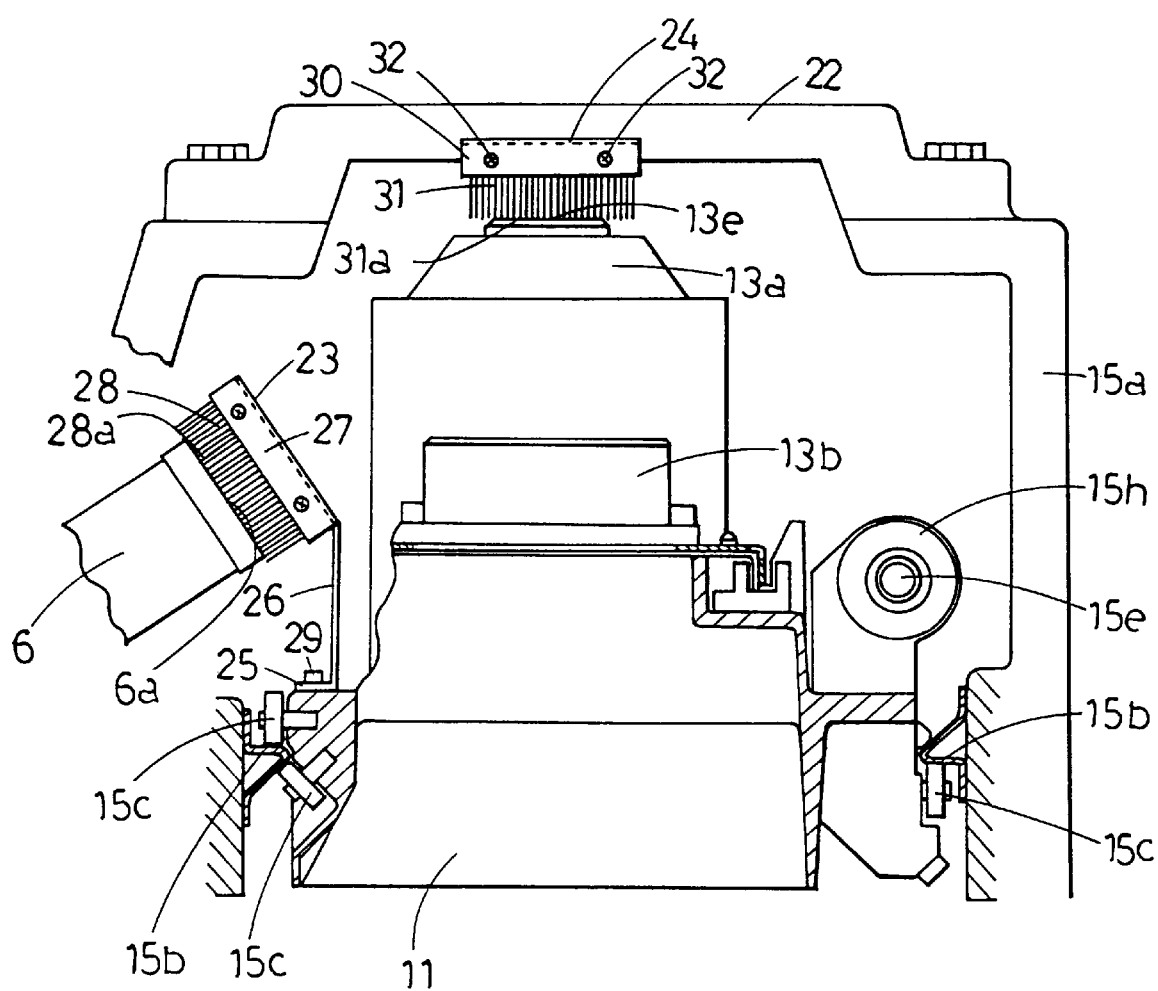
FIG. 13 is an enlarged cross sectional view of a primary part of Embodiment 3.
Figure 17:
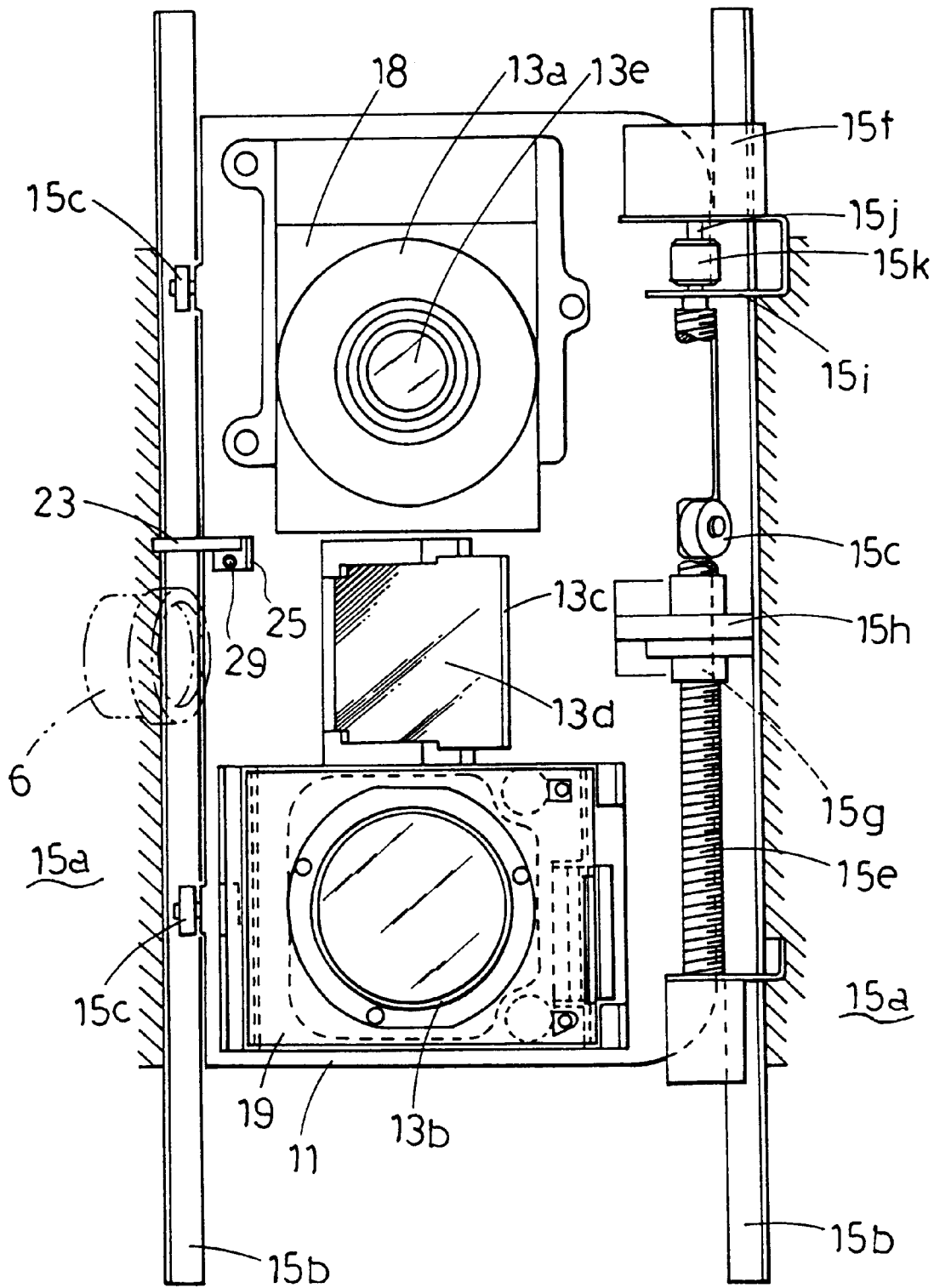
FIG. 17 is an explanatory view of a primary part of Embodiment 3.

The forward and backward driving means comprises a pair of rails 15b, a lens carriage 11, rollers 15c, a joint or lug 15h, a leadscrew 15e, and a motor 15f, as best shown in FIGS. 13 and 17. More specifically, two, left and right rails 15b are mounted on lowermost ends of opposite arms of a frame 15a fixedly mounted to the casing 1. The lens carriage 11 is supported by the rollers 15c on the rails 15b so that carriage 11 can run between and along the two rails 15b. Also, the lens carriage 11 is inclined from the horizontal to extend at a right angle to the exposure axis L (FIG. 12). The joint or lug 15h is coupled to one side of the lens carriage 11 and has a screw hole 15g provided therein. The leadscrew 15e is threaded into the screw hole 15g of the joint or lug 15h. The leadscrew 15e is joined at one end by a coupling 15k to a drive shaft 15j of motor 15f which is fixedly mounted by a support 15i to the frame 15a. Accordingly, the lens carriage 11 runs with its roller 15c along the rails 15b as the joint or lug 15h is moved by the motor 15f.

Figure 15:
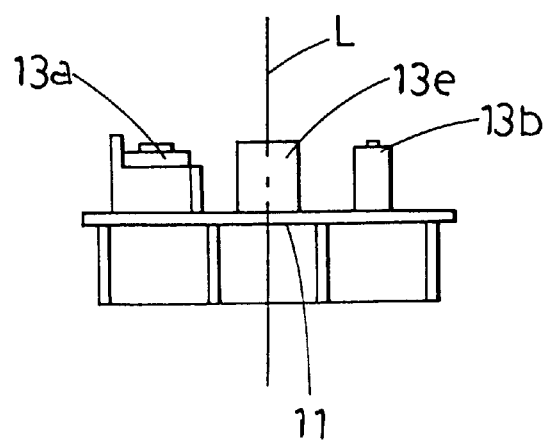
FIG. 15 is an explanatory view showing a reflector mirror located across the axis of exposure light in Embodiment 3.
Figure 16:
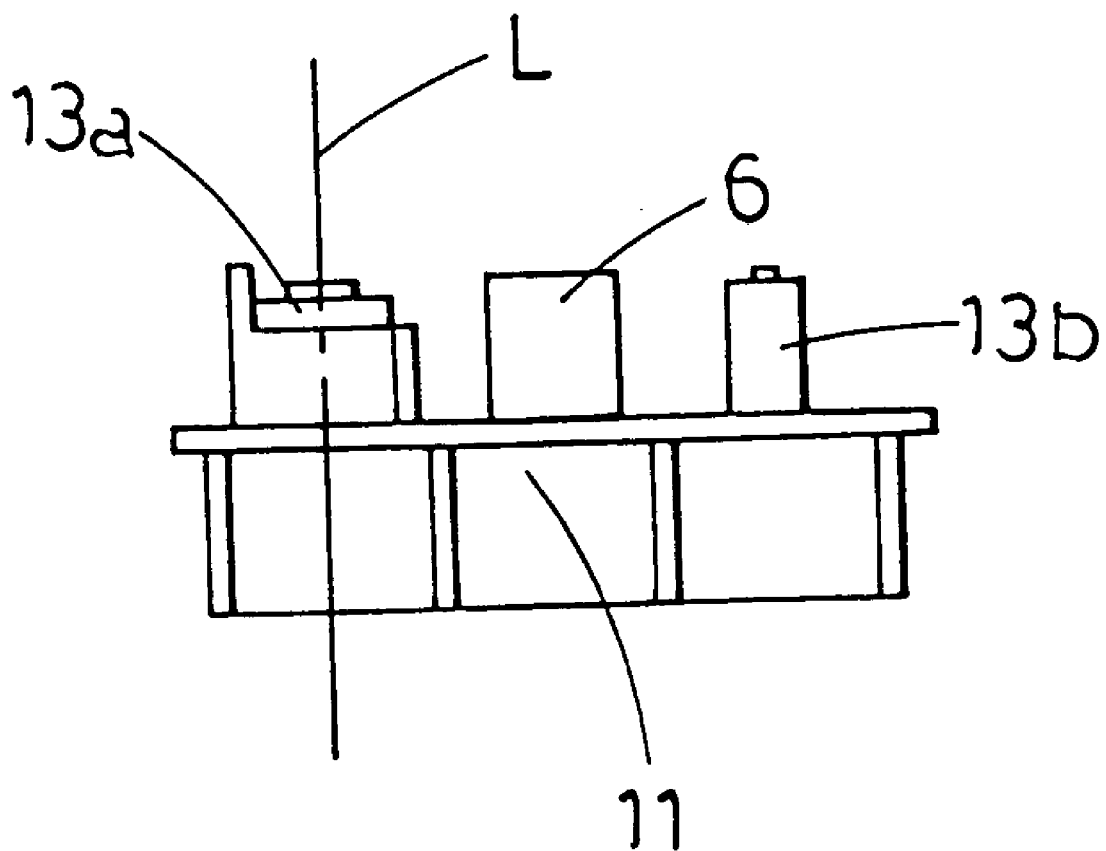
FIG. 16 is an explanatory view showing a zoom lens located across the axis of exposure light in Embodiment 3.

The various focal lens 13b, reflector mirror 13c, and zoom lens 13a are lengthwisely aligned at predetermined intervals on the lens carriage 11. More particularly, the various focal lens 13b and the zoom lens 13a are fixedly mounted by a pair of lens plates 18 to the lens carriage 11. The reflective mirror 13c is fixedly mounted between the two lenses 13b and 13a on the lens carriage 11 so that mirror surface 13d of mirror 13c is tilted to extend diagonally of the lens carriage 11. The various focal lens 13b comprises a group of different focal length lenses which are detachably mounted to the lens carriage 11 and which correspond to multiple sizes of the negative film. A desired one of the various focal lens 13b, reflector mirror 13c, and zoom lens 13a can thus be located to extend across the exposure axis L by movement of the lens carriage 11 (FIGS. 15 and 16).

Scanner 6 is provided adjacent the lens carriage 11 in the casing 1 for receiving a mode of light reflected by the mirror surface 13d of the reflector mirror 13c. The scanner 6 hence reads data of a frame image on the negative film 14a loaded in the negative mask 14 when the reflective mirror 13c is located to extend across the exposure axis L.

Figure 14:
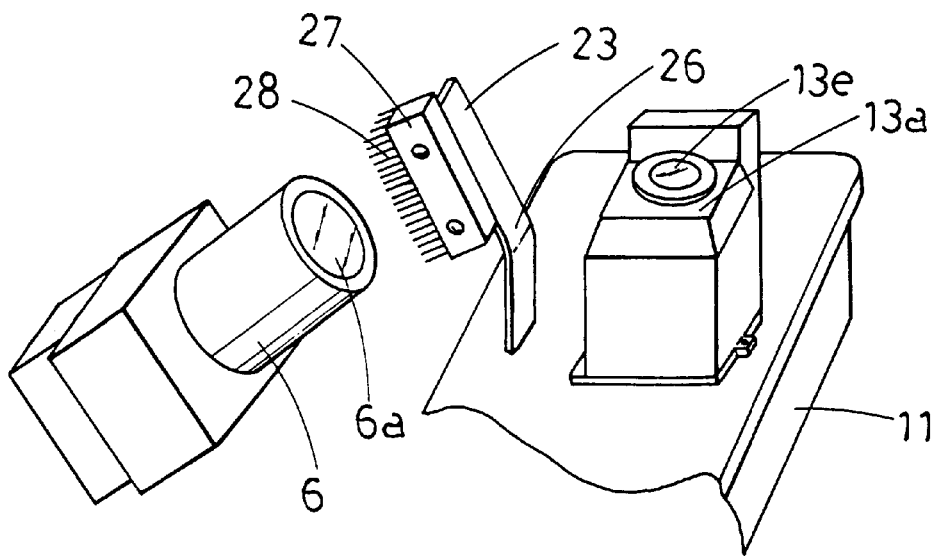
FIG. 14 is a schematic perspective view of a primary part of Embodiment 3.

In addition, cleaning brushes 23 and 24 serving as dust removing means are mounted on a frame base 22 disposed above the various focal lens 13b, reflector mirror 13c, and zoom lens 13a on the lens carriage 11 (FIGS. 12 to 14). The cleaning brush 23 comprises, as shown in FIG. 13, a support 26 having a lowermost portion 25 thereof bent at a right angle and shaped in a V configuration, a brush holder 27 mounted to an outer side of the support 26, a brush 28 consisting of a multiplicity of horse hairs fixed in the brush holder 27, and a bolt 29 by which portion 25 of support 26 is secured to the lens carriage 11. The brush 28 of the cleaning brush 23 cleans with its distal end 28a a lens 6a of the scanner 6 as the lens carriage 11 travels. The cleaning brush 23 is specifically located on the lens carriage 11 so that it never disturbs the scanner 6 reading of image data from the negative film 14a through the reflector mirror 13c extending across the exposure axis L (FIG. 17). The cleaning brush 24 is mounted by screws 32 to a lower side of the frame base 22. The cleaning brush 24 comprises a brush holder 30 and a brush 31 consisting of a multiplicity of horse hairs fixed in the brush holder 30. The cleaning brush 24 operates to sweep with distal end 31a of brush 31 over surface 13e of the zoom lens 13a as the lens carriage 11 travels.

In the photographic exposure apparatus of this embodiment, the lens carriage 11 is moved by the motor 15f (FIG. 17) rotating the leadscrew 15e until the reflector mirror 13c is positioned to extend across the exposure axis L. Then, the scanner 6 is actuated to read data of a desired frame image on the negative film 14a. This is followed by further movement of the lens carriage 11 to select the various focal lens 13b or zoom lens 13a for exposing the printing paper PI at the exposure location $L_1$ to an intensity of light.

As the lens carriage 11 travels forwardly and backwardly, the brush end 28a of cleaning brush 23 runs directly on and sweeps over the lens 6a of the scanner 6, thus removing dust therefrom. Simultaneously, the cleaning brush 24 mounted to the frame base 22 runs directly on the surface 13e of the zoom lens 13a and removes dust therefrom during the travel of the lens carriage 11.

Embodiment 4

Figure 18:
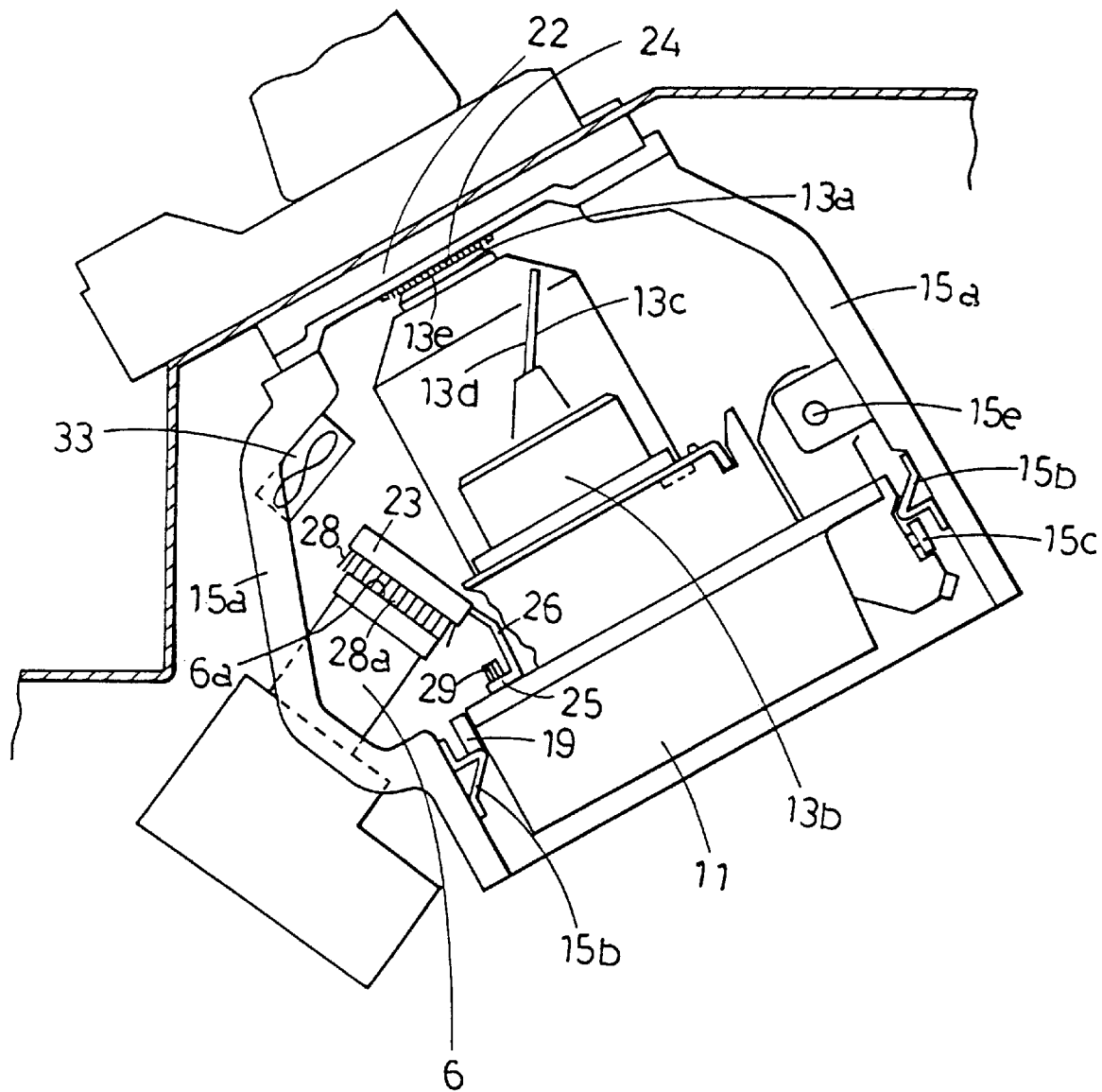
FIG. 18 is an enlarged cross sectional view of a primary part of a photographic exposure apparatus according to Embodiment 4 of the present invention.

FIG. 18 illustrates a further photographic exposure apparatus of Embodiment 4 of the present invention, in which like components are denoted by like numerals as those in the previous embodiments and will not be explained in further detail. In this embodiment, a fan 33 is mounted to the frame 15a above the lens 6a of the scanner 6 for blowing diagonally downwardly. In operation, the fan 33 blows against the lens 6a of the scanner 6 and the cleaning brush 23 on the lens carriage 11, thus promoting the removal of dust from the lens 6a and the cleaning brush 23.

Although the brushes 28 and 31 of the cleaning brushes 23 and 24 are described above as made of horse hairs, they may be formed of polyester, nylon, carbon fiber, acrylic copper compound (providing electrostatic discharge effect), and other materials.

We claim:

1. A photographic exposure apparatus for exposing a frame image of a negative film, said apparatus comprising:

a shutter for allowing or blocking passage of exposure light along an exposure light axis;

a lens carriage having a lens mounting region having mounted thereon an exposure lens and a light shielding region;

switching means for moving said lens carriage selectively between an exposure position at which said lens extends across said axis and a standby position at which said light shielding region extends across said axis and a reflector mirror mounted on said light shielding region; and a scanner positioned to, when said light shielding region extends across said axis, read through said reflector mirror data on the frame image of the negative film.

2. An apparatus as claimed in claim 1, wherein said scanner is mounted on said lens carriage and is movable therewith.

3. An apparatus as claimed in claim 1, wherein said lens carriage is movable by said switching means in opposite rectilinear directions.

4. An apparatus as claimed in claim 1, wherein said lens carriage has plural lens mounting regions each having mounted thereon a respective exposure lens.

5. An apparatus as claimed in claim 4, wherein one said exposure lens is a zoom lens.

6. A photographic exposure apparatus for exposing a frame image of a negative film, said apparatus comprising:

a first shutter for allowing or blocking passage of exposure light along an exposure light axis;

a lens carriage having a lens mounting region having mounted thereon an exposure lens and a light shielding region;

switching means for moving said lens carriage selectively to locate said lens to extend across said axis;

a second shutter for preventing exposure to scattered light; and a mechanical linking means responsive to movement of said lens carriage for closing and opening said second shutter, such that when said lens on said lens carriage is dislocated from said axis in a standby mode said mechanical linking means closes said second shutter to interrupt the scattered light, and when said lens extends across said axis in an exposure mode said mechanical linking means opens said second shutter.

7. An apparatus as claimed in claim 6, wherein said mechanical linking means comprises a projection disposed on said second shutter and actuated by said lens carriage for opening and closing said second shutter.

8. An apparatus as claimed in claim 6, further comprising a reflector mirror mounted on said light shielding region, and a scanner positioned to, when said light shielding region extends across said axis, read through said reflector mirror data on the frame image of the negative film.

9. An apparatus as claimed in claim 8, wherein said scanner is mounted on said lens carriage and is movable therewith.

10. An apparatus as claimed in claim 6, wherein said lens carriage is movable by said switching means in opposite rectilinear directions.

11. An apparatus as claimed in claim 6, wherein said lens carriage has plural lens mounting regions each having mounted thereon a respective exposure lens.

12. An apparatus as claimed in claim 11, wherein one said exposure lens is a zoom lens.

13. A photographic exposure apparatus for projecting an image on a negative film onto a sheet of printing paper, said apparatus comprising:

a casing;

an exposure lens;

forward and backward traveling means for moving said exposure lens relative to said casing into and out of an exposure position;

dust removing means mounted on said casing for, upon movement of said exposure lens relative to said casing, removing dust from said exposure lens;

scanner mounted on said casing; and further dust removing means mounted on said traveling means at a position for, upon movement of said exposure lens relative to said casing, removing dust from said scanner.

14. An apparatus as claimed in claim 13, wherein said dust removing means mounted on said casing is fixedly mounted on said casing and is immovable relative thereto.

15. An apparatus as claimed in claim 13, wherein said further dust removing means is fixedly mounted on said traveling means and is immovable relative thereto.

16. An apparatus as claimed in claim 13, further comprising a fan mounted at an appropriate location of said casing to assist or help the dust removing action of said dust removing means.

17. A photographic exposure apparatus for projecting an image on a negative film onto a sheet of printing paper, said apparatus comprising:

a casing;

an exposure lens;

forward and backward traveling means for moving said exposure lens relative to said casing into and out of an exposure position;

a scanner mounted on said casing; and dust removing means mounted on said traveling means for, upon movement of said exposure lens relative to said casing, removing dust from said scanner.

18. An apparatus as claimed in claim 16, wherein said dust removing means is fixedly mounted on said traveling means and is immovable relative thereto.

19. An apparatus as claimed in claim 17, further comprising a fan mounted at an appropriate location of said casing to assist or help the dust removing action of said dust removing means.

* * * * *